July 28, 1970 — A. E. BAKER, JR., ET AL — 3,522,095
LAMINAR MEMBRANE FUEL CELLS AND PROCESSES FOR THEIR MANUFACTURE
Filed Jan. 14, 1965
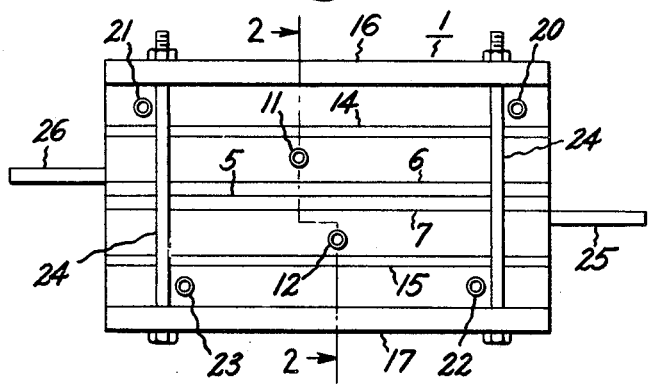
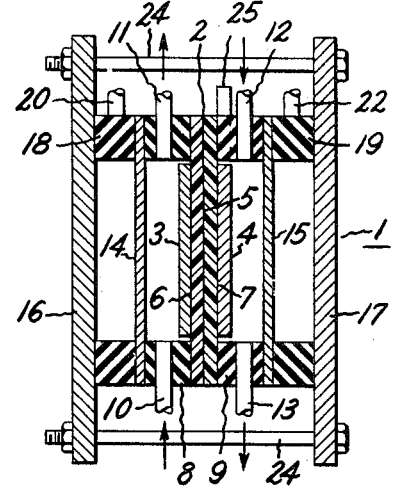
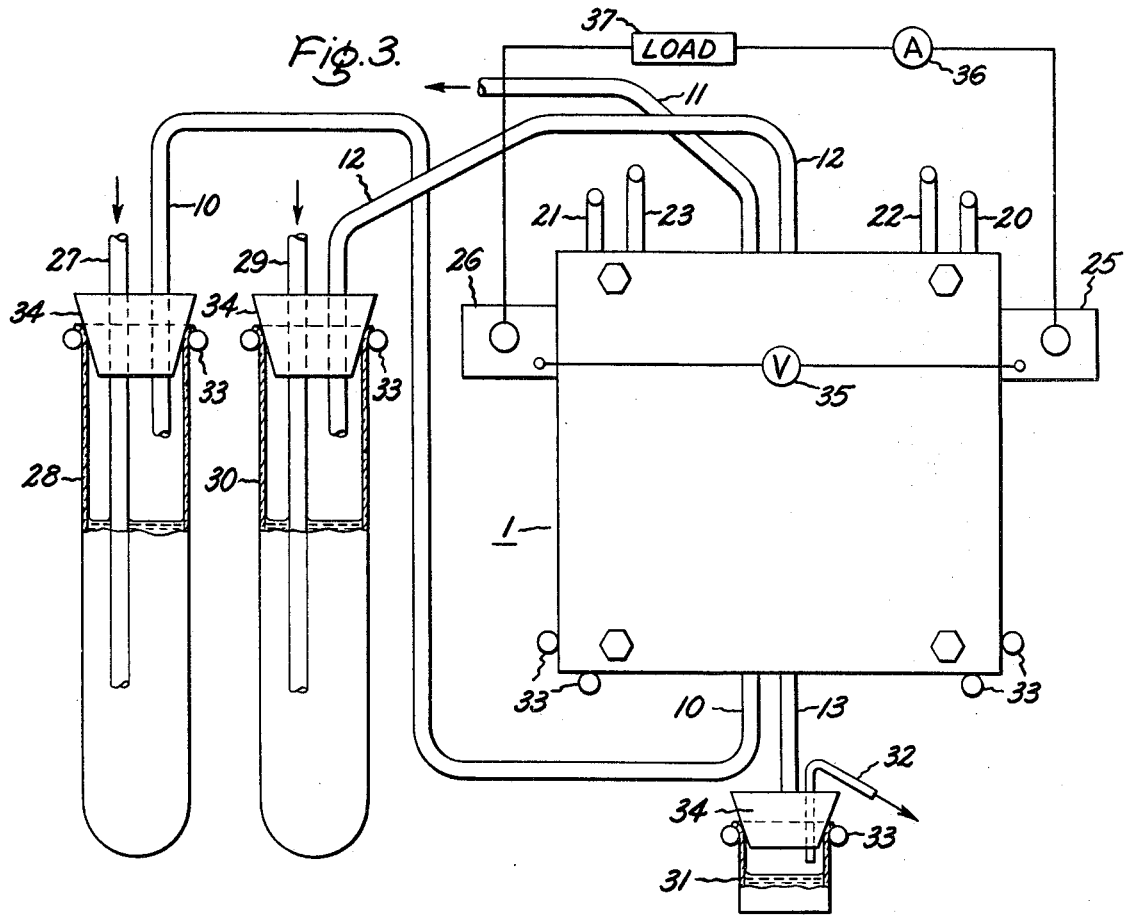
Inventors:
Albert E. Baker, Jr.,
Edward Chalmers, Jr.,
Peter N. Rigopulos,
by
His Attorney.

3,522,095
LAMINAR MEMBRANE FUEL CELLS AND PROCESSES FOR THEIR MANUFACTURE
Albert E. Baker, Jr., Ipswich, Edward Chalmers, Jr., Arlington, and Peter N. Rigopulos, Melrose, Mass., assignors to General Electric Company, a corporation of New York
Filed Jan. 14, 1965, Ser. No. 425,447
Int. Cl. H01m 27/00
U.S. Cl. 136—86          3 Claims

ABSTRACT OF THE DISCLOSURE

A fuel cell is formed by laminating two ion exchange membranes of like composition to form a laminar ion exchange membrane. Electrodes are attached and hardware provided to direct fuel and oxidant to the electrodes. The membranes may be laminated by vibration or, in the case of fluorinated polymers, by chemically degrading the surfaces to be brought together. Mixtures of platinum and polytetrafluoroethylene as well as titanium palladium alloy screens have both been found to produce long life membranes when positioned at the interface of the laminae.

---

This invention relates to fuel cells having ion exchange membranes. Specifically, the invention relates to laminar ion exchange membranes, laminated ion exchange membrane-electrode assemblies, and to processes for their manufacture.

As illustrated by Pat. 2,913,511 to Grubb and Pat. 3,134,697 to Niedrach, it has been recognized that ion exchange membranes may be advantageously employed as electrolytes in fuel cells. In the typical fuel cell construction, the ion exchange membrane constitutes the principal barrier separating the cell into separate fuel and oxidant chambers. Any perforations of the barrier, whether a rupture or a mere pinhole, allows direct intermingling of the fuel and oxidant, thereby leading to reduced cell output or failure.

The effectiveness of an ion exchange membrane as a partitioning barrier may be impaired by any one of a number of factors. Pinholes, fissures, or entrapped air bubbles, commonly termed "fish eyes," that are common defects in plastic sheet materials may be present in the membrane at the time it is mounted in the fuel cell. Additionally, continuously formed plastic sheets are frequently molecularly oriented along the axis of material transport. Such materials are anisotropic and exhibit reduced mechanical strength transverse to the direction of molecular alignment.

Once mounted in a fuel cell, an ion exchange membrane is subjected to physical stresses. The ion exchange membrane may be burst by a high pressure differential across the face as would occur, for example, should either the fuel or oxidant supply to the membrane accidentally be cut off or overpressurization occur on one side of the membrane. Further, the pressure balance between the fuel and oxidant faces of the membrane may shift repeatedly during use resulting in flexing of the membrane in first one direction and then another until the membrane is ruptured through fatigue. Finally, isolated structural weaknesses in the ion exchange membrane may produce localized elevated temperature areas on the membrane accelerating electrochemical attack of the membrane with attendant degradation and barrier failure.

It is an object of the invention to provide an improved fuel cell having an ion exchange membrane of greater structural strength and of increased barrier effectiveness.

It is an additional object of the invention to provide a fuel cell having a membrane-electrode assembly of greater structural strength, increased barrier effectiveness, and enhanced catalytic effectiveness.

It is a further object of the invention to provide improved processes of forming ion exchange membranes and membrane-electrode assemblies.

These and other objects of my invention are accomplished by providing a fuel cell equipped with a laminar ion exchange membrane. Electrodes may be conventionally joined to the laminar membrane or by the use of an ion exchange adhesive. Ion exchange membrane laminae may be joined by the use of such bonding agents as blended electrocatalyst and synthetic resin mixtures or ion exchange adhesives. Alternately, laminae may be united directly using noncorrosive foraminous or particulate bonding elements. The laminae may be pretreated for lamination using swelling agents or, in the case of fluorine-containing polymers, chemical degrading agents. The pretreated laminae may optionally be united without bonding agents or elements. Finally, laminae may be united to form an ion exchange membrane using high frequency vibrations.

The invention may be better understood by reference to the following detailed description and drawings in which:

FIG. 1 is a plan view of a fuel cell constructed according to the invention,

FIG. 2 is a vertical section taken along section line 2—2 in FIG. 1, and

FIG. 3 is a schematic illustration of the fuel cell test apparatus.

The ion exchange membranes employed in the present invention are fabricated from ion exchange resins in sheet form. These resins include in their polymeric structure ionizable radicals, one ionic component of which is fixed or retained by the polymeric matrix with at least one ion component being a mobile, replaceable ion electrostatically associated with the fixed component. Ion exchange resins are categorized as cation exchange resins or anion exchange resins, depending on whether the mobile ion is a cation or an anion. Adequate specific examples of ion exchange resins are set out in the above-noted Grubb and Niedrach patents. The preparation and properties of a number of different types of ion exchange resins are additionally described throughout the literature and in particular in Ion Exchange, Nachod, Academic Press, Inc., New York (1950); Ion Exchange Resins, Kunin and Myers, John Wiley and Sons, Inc., New York (1950); Styrene, Its Polymers and Copolymers and Derivatives, Boundy and Boyer, Reinhold, New York (1950); and in U.S. patents such as Pats. 2,366,007 and 2,366,008 to D'Alelio; Pat. 2,663,702 to Kropa; Pat. 2,664,397 to Hutchinson; Pat. 2,678,306 to Ferris; Pat. 2,658,042 to Johnson; Pats. 2,681,319; 2,681,320; and 2,827,426 to Bodamer; and Pat. 3,133,889 to Hazenberg.

The formation of these ion exchange resins into membrane or sheet form is also well known in the art. In general, these membranes are of two forms, the mosaic or heterogeneous type in which granules of ion exchange resin are incorporated into a sheet-like matrix of a suitable binder, for example, a binder of polyethylene or polyvinyl chloride, and the continuous or homogeneous type in which the ion exchange resin forms the entire membrane or is uniformly blended with the matrix polymer at the molecular level. The above-noted Hazenberg patent is illustrative of a process of forming a membrane consisting of an ion exchange polymer blended with a matrix polymer at the molecular level while Bodamer Pat. 2,827,426 describes a process of forming a membrane from a heterogeneous polymer. The formation of ion exchange membranes is additionally described for example in, Amberplex Ion Permeable Membranes, Rohm and Haas, Philadelphia (1952) and in the reference mentioned in this publication. Further, the preparation of a plurality of different types of ion exchange membranes is described in Pat. 2,636,851 to Juda et al. and in Pat. 2,702,272 to Kasper.

Ion exchange membranes are unitary sheets of synthetic resin containing from about 10 to 60 percent by weight water. The water is held in the membrane by secondary Van der Waals forces and functions as a transport media allowing migration of the mobile ions.

When mounted in a fuel cell, an ion exchange membrane must function to conduct mobile ions between its surfaces and must serve as a physical barrier dividing the cell into separate fuel and oxidant chambers. While the thickness of an ion exchange membrane is generally inversely related to its efficiency as an ionic conductor or electrolyte, reduction of the thickness is generally limited by the structural requirements of the membrane in acting as a barrier. The choice of membrane thickness may vary widely depending on whether primary emphasis is placed on immediate cell output or over-all cell reliability. Ion exchange membranes typically vary between 2 and 30 mils in thickness.

It is our discovery that fuel cells employing laminar ion exchange membranes exhibit greater reliability than fuel cells employing conventional unitary ion exchange membranes of equivalent thickness. Although any desired number of laminae may be employed to build up a laminar membrane of the desired thickness, the advantages of the invention may be achieved using only two laminae. The adjacent laminae must be bonded such that the interface therebetween is electrolytically conductive, thereby allowing passage of ions between laminae.

One bonding agent of utility in uniting adjacent ion exchange membrane laminae is a mixture of an electrocatalyst and a synthetic resin. Generally, it is preferred to employ the synthetic resin component in the range of 5 to 50 percent by weight. The electrocatalyst is employed in a finely divided, preferably powdered form so as to exhibit a high proportion of surface area per unit weight. The synthetic resin and catalyst may be blended as a powder or mixed in an aqueous slurry.

The electrocatalytic materials which may be employed are preferably noble metals of the Group VIII series, namely, ruthenium, rhodium, palladium, osmium, iridium, and platinum. Other suitable materials include other metals of the Group VIII series, e.g., nickel, cobalt, and iron, metals of the Group I-B series, e.g., copper, silver, and gold; and metals of the transition series, e.g., manganese, vanadium, rhenium, etc. In view of the highly acidic character of cation exchange membrances, it is preferred that only the noble metals of the Group VIII series be used therewith, since corrosion of the metals will shorten the cell life. In the use of anionic exchange membranes, the basic conditions do not offer the same corrosion problem and any of the electrocatalytic materials above set out may be employed.

A wide variety of synthetic resins may be employed as bonding agents. Polytetrafluoroethylene is preferred bonding agent in view of its high stability and inertness. Other acceptable synthetic resins employable include polytrifluorochloroethylene, polytrifluoroethylene, vinylidene fluoride, and such nonfluorinated polymers as polyethylene, polypropylene, vinylidene chloride, polystyrene, etc. Generally, the synthetic resin employed in the bonding agent should be at least as chemically stable as the membrane laminae to be united.

An alternate bonding agent for uniting laminae to form an ion exchange membrane is an ion exchange adhesive. Any synthetic resin having ion exchange properties and adhesive properties is applicable. In uniting cationic laminae it is necessary to use an adhesive having cationic exchange properties such as phenol-formaldehyde sulfonic acid, sulfonated styrene-divinyl benzene copolymer, etc. Anion exchange adhesives for uniting anionic laminae can be formed by substituting phenol-formaldehyde resin, styrene-divinyl benzene copolymer, melamine-formaldehyde resin, polyalkylene-polyamine-formaldehyde resin, etc. with such basic substituents as amine groups, quaternary ammonium hydroxides, the guanidine group, the dicyandiamidine group, and other nitrogen-containing basic groups. The synthetic resin employed as an ion exchange adhesive may be rendered suitably tacky in any one of a number of ways. Adhesiveness may be imparted to the resin by using it in an aqueous solution or by use in monomeric or partially polymerized form. In the case of thermoplastic synthetic resins, adhesiveness may be imparted by heating during laminating.

Instead of using ionically conductive bonding agents as above described, adjacent laminae also may be united directly to form an ion exchange membrane. In directly uniting ion exchange laminae, it is preferred that means be interposed between adjacent laminae which upon pressing will physically bond the laminae with the mating faces thereof in intimate, ionically conductive relationship. Foraminous material may be advantageously employed such as woven sheets of wire or fiber, thinly felted mats, expanded metal sheets, perforate sheets, etc. Alternately, angular grain particulate material may be employed. The bonding elements may be of any configuration capable of holding the laminae together upon pressing and at the same time allowing direct contact between the ion exchange laminae at the interface. The bonding elements should be formed of noncorrosive material, e.g., glass, asbestos, stainless steel, refractory materials, etc. A preferred bonding element is an expanded metal screen formed of titanium and containing 0.2 percent by weight palladium. Other preferred bonding elements include nickel, tantalum, and stainless steel screen materials.

Before utilization of the above-described bonding agents or elements, it may be desired to prepare the bonding face of one or each of the lamina to be employed. Swelling solvents such as acetone, chloroform, dimethyl sulfoxide, acetamide, etc., are generally effective in facilitating lamination. The swelling solvents may be applied to the surface of the lamina, as by painting, or the lamina may be immersed in the swelling solvents.

Fluorinated polymers are relatively inert to ordinary swelling solvents. Such polymers may be pretreated with solvent compositions chemically attacking the polymer to remove a portion of the fluorine atoms. One such composition is comprised of sodium metal and naphthalene in equi-molar proportions. The naphthalene is solvated in an excess of tetrahydrofuran. An alternate composition is comprised of equi-molar proportions of sodium metal and liquid anhydrous ammonia. After contact with the chemical degrading agents, the polymers are thoroughly rinsed in inert liquids. Rinsing should normally be accomplished in two stages. The first stage of rinsing should employ a swelling solvent of the type above noted or a hydrocarbon such as toluene, for example, while the final rinsing should be with water.

Ion exchange laminae pretreated with swelling solvents or chemical degrading agents of the type set out are excellently prepared for lamination using any one of the bonding agents or elements above described. Alternately, such pretreated laminae may be directly united without the use of any other bonding agent or element.

The laminae to be formed into a laminar ion exchange membrane are stacked for lamination with a bonding element or agent between adjacent laminae. When at least one of the laminae forming an interface has been pretreated, the bonding element or agent may be omitted from the interface.

It is preferred in stacking to relatively orient the laminae to eliminate or at least minimize the net anisotropism of the laminar membrane. In most continuous techniques of working polymer plastics, a certain degree of molecular alignment is imparted to the polymers. This is generally the result of the stressing along one longitudinal axis that occurs as the polymer in continuous sheet or strip form is pulled along the process line. Any technique of plastic working employing uniaxial stressing will impart a certain degree of anisotropism to polymeric materials. While conventional unitary ion exchange membranes exhibit a high degree of tensile strength in the direction of uniaxial stressing, the mechanical strength of the membrane in a transverse direction, i.e., transverse to the direction of molecular alignment, may be significantly lower. Laminar ion exchange membranes may be formed of significantly reduced anisotropism even when the laminae themselves are distinctly anisotropic, provided the laminae are relatively oriented such that the direction of uniaxial stressing in the respective laminae are disaligned. In forming a laminar membrane from two laminae, for example, it is preferred to orient the directions of uniaxial stressing of the respective laminae at right angles. In the case of three laminae a sixty degree orientation is preferred.

The laminae stack may be bonded by any conventional means supplying the necessary activation energy. Generally, lamination is accomplished in a press. The pressure and temperature applied by the press and the duration of the two are inter-related variables. Lamination may be achieved at high pressures at room temperatures while lamination at above 300° F. can normally be achieved with only nominal pressures. Laminating in the lower temperature and pressure ranges can be achieved by increasing the residence time of the membrane in the press. Residence times of 60 minutes or longer have been found operable. Generally, laminating temperatures of up to 350° F. are contemplated while laminating pressure of up to 20,000 p.s.i. are contemplated. Neither the pressure nor temperature of laminating are critical, and the proper choice of conditions is considered well within the ordinary skill of the art.

The practice of the invention is not limited, however, to press laminating. A laminae stack may be united using high frequency vibrations. One form of vibration laminating consists of drawing a vibrating probe having a contact surface of less than one-quarter of a square inch back and forth across the stack until the entire stack is laminated. Suitable vibrators include those having a frequency in excess of 1.0 kc./sec. and delivering a power of at least 5 watts to the stack.

Neither pretreatment, bonding agents, nor bonding elements are necessary to laminate a stack using vibrations in excess of 1 kilocycle per second, although utilization of such treatments, agents, and elements in combination with vibration laminating are contemplated and preferred.

When the laminar membrane is to be used in a fuel cell, an electrode-membrane assembly may be formed by any known method. Suitable electrodes for use in fuel cells are disclosed by the above-cited Grubb and Niedrach patents. A preferred electrode consists of a mixture of Pt black and from 5 to 25 percent by weight polytetrafluoroethylene (PTFE) spread on an expanded metal screen current collector formed of Ti alloyed with 0.1 to 10.0 percent by weight Pd. Such an electrode may be formed by placing a current collector adjacent an upper press platen and placing a mold release agent such as aluminum foil on a lower platen. The catalyst-PTFE mixture is spread on the mold release agent to the desired depth. Subsequently, the current collector is pressed into the catalyst-PTFE mixture with a force of 1 to 7 tons/in.$^2$ so that the screen openings are filled. Upon removal from the press, the aluminum is removed by treatment with KOH and the KOH neutralized in acid. Distilled water is used in the final rinsing. The electrode is subsequently dried and sintered. Alternately, the electrode may be formed without the use of a metal screen, in which case the electrode is formed substantially as the resin-catalyst mixture employed as a laminating agent.

The electrodes may be mounted on the laminar membranes by any conventional method. A preferred method of uniting electrodes to the laminar membrane consists of placing a laminar membrane in a sandwich arrangement between two electrodes and applying heat and pressure. Wide ranges of temperatures and pressures may be employed with temperatures of 175° F. to 250° F. and pressures 2000–3000 p.s.i. being preferred.

The electrodes either before or after fabrication into electrode-membrane assemblies may be given an additional wet-proofing treatment. Various conventional wet-proofing techniques may be employed. One preferred technique consists of spraying the surface of the electrode which is to be the outer surface of the electrode-membrane assembly with an aqueous solution of polytetrafluoroethylene and water. Water may be subsequently removed from the electrode by sintering of the electrode at temperatures above 200° F. or by holding the electrode above the evaporating temperature of water for a substantial period. Sintering is generally effective in time periods ranging from less than 5 minutes to over an hour.

Another method of uniting the fuel cell electrodes to the ion exchange membrane to form an electrode-membrane assembly consists of using an ion exchange adhesive. Such adhesive is subject to the same general considerations outlined above in regard to ion exchange adhesives for ion exchange laminae. The electrodes may be united to a laminar membrane at the time the laminae stack is bonded. It is appreciated that electrodes may be bonded to conventional, unitary membranes with the use of ion exchange adhesives and that the process of electrode bonding is in no way limited to use with laminar membranes.

In bonding electrodes to laminar membranes, it is possible to unite the electrodes to the laminae either before, during, or after uniting the laminae. When the identical type of bonding is used to unite the electrode and membrane as is used to unite the membrane laminae, simultaneous bonding of all elements is advantageous. On the other hand, significantly different pressures may be used to laminate the electrodes to the laminae than are used to unite adjacent laminae. In such case, separate bonding steps are necessary.

Electrode-membrane assemblies fabricated according to the teaching of the present invention are applicable to ion exchange membrane fuel cells generally. A more complete understanding of the invention as it relates to fuel cells is imparted by reference to the drawings.

As illustrated in detail in FIGS. 1 and 2, a fuel cell 1 is provided with a laminar ion exchange membrane 2 having electrodes 3 and 4 adjacent the opposed faces thereof. The laminar membrane 2 is provided with an ionically conductive interface 5 between adjacent laminae. If desired, bonding agents or elements may be incorporated at the interface. An interface 6 is provided between electrode 3 and laminar membrane 2. The interface is ionically conductive and may be formed using conventional electrode-membrane uniting techniques or by the use of an ion exchange adhesive. A similar interface 7 is provided between electrode 4 and the laminar membrane.

The electrodes 3 and 4 together with the laminar membrane 2 form an electrode-membrane assembly. The assembly is mounted on the fuel cell by means of gaskets 8 and 9 on opposite sides thereof. Gasket 8 is provided with a fuel inlet conduit 10 and fuel exhaust conduit 11 therein. Gasket 9 is provided with an oxidant inlet conduit 12 and an oxidant outlet conduit 13. Gasket 8 together with imperforate sheet 14 form a fuel chamber adjacent the electrode-membrane assembly while gasket 9 and imperforate sheet 15 form an oxidant chamber.

End plates 16 and 17 are spaced from sheets 14 and 15 by gaskets 18 and 19, respectively. Coolant is supplied to the sheet 14 by coolant inlet conduit 20 in gasket 18, and coolant is removed by conduit 21 also in gasket 18. Sheet 15 is similarly supplied with coolant by conduits 22 and 23 in gasket 19.

The fuel cell 1 is held together by tie bolt assemblies 24. Electrical current is taken from the cell by terminals 25 and 26 forming extensions of electrodes 3 and 4, respectively.

The fuel cell 1 is merely illustrative of the invention. For example, it is not necessary to supply coolant to the fuel cell. Accordingly, one or both of sheets 14 and 15 as well as gaskets 18 and 19 could be omitted from the cell construction. A greater number of laminae may be employed in the laminar membrane. A counter-current displacement of fuel and oxidant through the cell have been described, however, a concurrent displacement could be used if desired. Further, a cross-current displacement could be afforded merely by rotating one of gaskets 8 and 9 by 90 degrees. Numerous additional obvious modifications will be apparent to one skilled in the art.

FIG. 3 illustrates an apparatus for operating fuel cell 1 under test. Using hydrogen as an exemplary gaseous fuel, hydrogen is supplied to test tube 28 by means of conduit 27. The test tube contains water whereby the lower end of the conduit 27 extends below the surface of the water and hydrogen is bubbled to the hydrogen inlet conduit 10 for the fuel cell. Oxidant, such as oxygen, is similarly supplied by conduit 29 extending into a water reservoir in test tube 30. Oxygen is bubbled to oxidant inlet conduit 12 of the fuel cell.

In the illustrative case of hydrogen as a fuel, oxygen as an oxidant, and cation permeable laminar membrane, reactions will take place at the electrodes 3 and 4, respectively, according to the following formulas:

$$H_2 \rightarrow 2H^+ + 2e \quad (1)$$

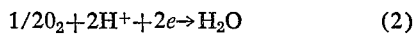
$$1/2 O_2 + 2H^+ + 2e \rightarrow H_2O \quad (2)$$

Product water formed on the oxygen side of the laminar membrane will be removed from the cell 1 through oxidant exhaust conduit 13. Product water will be collected in beaker 31 while excess oxygen is removed through conduit 32.

In the particular configuration shown, pegs 33 are shown whereby the apparatus may be mounted on a test board and 3 two-hole stoppers 34 are shown as sealants at the up ends of the test tubes and beaker.

The electrical circuitry used in testing the fuel cell 1 is schematically shown. A voltmeter 35 is connected between the terminals 25 and 26. An ammeter 36 is connected in series with a load 37 in a separate circuit between the cell terminals.

The following examples are illustrative of the practice of the invention and are not for purposes of limitation.

The examples were performed using ion exchange laminae formed from water saturated homogeneous mixed polymer sheet material. The mixed polymer was approximately 88 percent by weight a matrix polymer and 12 percent by weight an ion exchange polymer. The matrix polymer was a copolymer of chlorotrifluoroethylene and vinylidene fluoride. The vinylidene fluoride comprised 3.5 percent by weight of the copolymer. The ion exchange polymer was a sulfonated copolymer of styrene and divinyl benzene. The sulfonated styrene comprised 99.28 percent by weight of the ion exchange copolymer while the sulfonated divinyl benzene comprised 0.72 percent by weight. The ion exchange membrane of each example was 4 inches on a side (16 in.$^2$) while the electrodes in each example were 3 inches on a side (9 in.$^2$).

EXAMPLE 1

Two ion exchange laminae each having a thickness of 0.005 inch were immersed for 2 minutes in a solution consisting essentially of 1 mole of sodium metal and 1 mole of naphthalene solvated in an excess of tetrahydrofuran. The solution is commercially available under the trademark "Tetra-etch." Upon removal, the laminae were rinsed first in a bath of distilled water, then toluene, then acetone, and finally in distilled water again. The laminae were united in a press under a pressure of 4000 p.s.i., at a temperature of 240° F. applied over a period of fifty minutes.

EXAMPLE 2

Forty-two ion exchange laminae each having a thickness of 0.003 inch were formed into 21 two-ply laminar membranes according to the procedure of Example 1. Subsequent to treatment with "Tetra-etch" but prior to uniting, a thin layer of platinum black and 10 percent by weight polytetrafluoroethylene was transferred to one of each pair of laminae on a bonding face thereof by means of a transfer surface. The platinum black-polytetrafluoroethylene mixture was deposited on the transfer surface as an aqueous mixture and allowed to dry before transfer to the laminae.

EXAMPLE 3

Two laminae each having a thickness of 0.005 inch were united according to the procedure of Example 2.

EXAMPLE 4

The procedure of Example 1 was employed except that subsequent to treatment with "Tetra-etch" but prior to uniting a 4 x 4 inch expanded metal screen was inserted between the laminae. The screen exhibited a thickness of 3 mils and a strand width of 5 mils. The screen had a mesh designation of 5/0. The screen was formed of titanium alloyed with 0.2 percent by weight palladium.

EXAMPLE 5

Two laminae each having a thickness of 0.005 inch were stacked. A probe having a width of 1/16 inch was placed against the upper lamina and pressed against the lamina with a pressure of 50 p.s.i. The probe was vibrated at a frequency of 20 kilocycles per-second. The probe was supplied with a power input of 400 watts and transferred approximately 10 to 20 percent of the input energy to the laminae. The probe required slightly over ten seconds to complete one swatch across the surface of the upper lamina. The probe was moved back and forth across the upper lamina until the entire surface had been covered in a series of swaths 1/16 inch wide. The stack was then roated 90 degrees and the process repeated.

EXAMPLE 6

The procedure of Example 1 was employed except that subsequent to treatment with "Tetra-etch" but prior to uniting the laminae were coated with an aqueous solution of phenol-formaldehyde sulfonic acid. The solution was formed by mixing phenol-formaldehyde sulfonic acid with an equal volume of water. The solution was applied to the surfaces of the laminae to be coated with a brush.

EXAMPLE 7

For purposes of forming membrane-electrode assemblies ninety electrodes were prepared. Each of the electrodes was formed by mounting a current collector screen formed of titanium alloyed with 0.2 percent by weight palladium and having a mesh designation of 5/0 in contact with the upper platen of a press. A mold release material in the form of aluminum foil was placed adjacent the lower press platen. A particulate mixture of platinum black and 10 percent by weight polytetrafluoroethylene was spread on the aluminum foil. The current collector was pressed into the particulate mixture at a pressure of approximately 2 tons/in.$^2$ such that the openings in the screen were filled therewith. Upon removal from the press, the electrode was rinsed with potassium hydroxide to remove any trace of aluminum foil. The excess potassium hydroxide was neutralized with acid and the electrode finally rinsed with distilled water. The electrode was subsequently dried and sintered at above 200° F.

Twenty-seven electrodes so formed were given an additional wet-proofing treatment, since they were to form the oxygen side electrodes of membrane-electrode assemblies. Each such electrode was placed beneath an atomizer delivering a spray consisting essentially of an aqueous dispersion of polytetrafluoroethylene. The electrode was oriented such that the exposed face to be wet-proofed faced upwardly. The electrode was continuously moved within the spray such that a uniform coating was attained, and subsequently the electrode was subjected to a temperature of approximately 260° F. for a period of 10 minutes to remove water therefrom.

EXAMPLE 8

Membrane-electrode assemblies were formed by sandwiching a membrane between the two electrodes and mounting the stack in a press between polyethylene-terephthalate sheets and suitable pressure distributing plates. The stack was subjected to nominal press pressure and quickly heated to 215° F. Thereafter, the stack was subjected to a pressure of 2600 p.s.i. for a period of 5 minutes. At the end of 5 minutes, the confined membrane-electrode assembly was cooled to below 100° F. and released from the press.

The laminar membrane formed by procedure of Example 1 was sandwiched between two electrodes (one additionally wet-proofed), formed into a laminar membrane-electrode assembly, and given a cell designation number of 548.

Eight of the laminar membranes formed by the procedure of Example 2 were sandwiched between two electrodes and formed into laminar membrane-electrode assemblies. Cell designation numbers 677 to 684 inclusive were assigned. The remaining thirteen laminar membranes formed by the procedure of Example 2 were each sandwiched between two electrodes (one additional wet-proofed). The assemblies were given cell designation numbers 747, 749, 750 to 756 inclusive, and 688 to 691 inclusive.

The laminar membrane formed according to Example 3 was sandwiched between two electrodes (one additionally wet-proofed) and assigned a cell designated number 547.

The laminar membrane formed according to Example 4 was sandwiched between two electrodes (one additionally wet-proofed) and assigned a cell designation number 547.

The laminar membrane formed according to Example 5 was sandwiched between two electrodes and assigned a cell designation number 551.

For purposes of comparison, none unitary membranes having a thickness of 6 mils were each sandwiched between two electrodes. The resulting unitary membrane-electrode assemblies were assigned cell designation numbers 205 to 209 inclusive, 226, 231, 617D, and 618D.

Similarly, eleven unitary membranes having a thickness of 10 mils were each sandwiched between two electrodes (one additionally wet-proofed). The resulting unitary membrane-electrode assemblies were assigned cell designation numbers 738, 739, 742, 743, 745, 768, 779, 780, 781, 782, and 816.

EXAMPLE 9

The laminar membrane formed by the procedure of Example 6 and a unitary or one-ply membrane having a thickness of 0.010 inch were formed into electrode-membrane assemblies by the following procedure:

Electrodes were formed by the procedure set out in the first paragraph of Example 7.

Phenol-formaldehyde sulfonic acid was mixed with an equal volume of water. The bonding face of each electrode was brushed with phenol-formaldehyde sulfonic acid. The coated surfaces of each of two electrodes were pressed against the opposed faces of each membrane. The membrane-electrode assemblies were each tested in fuel cells and found operative.

EXAMPLE 10

The membrane-electrode assemblies formed by Example 8 were then mounted in a fuel cell for testing. Each electrode having additional wet-proofing was placed on the oxygen side of the cell.

The fuel cells were individually tested in a test board assembly of the type shown in FIG. 3. Hydrogen was used as a fuel and oxygen was used as an oxidant. The flow rates of oxygen and hydrogen were the same for all cells tested. The current was recorded as a function of time by automatic recording equipment. Coolant was supplied to the fuel cells so that cell operation was at a controlled temperature. In certain tests the current flowing between the cell terminals was held constant. In other tests the current was varied according to a duty cycle.

The duty cycle employed in the tests is set out in Table I. The results of the cell tests are set out in Table II.

TABLE I

| Current (amps/ft.$^2$): | Duration (hours) |
|---|---|
| 34 | 24 |
| 8 | 12 |
| 17 | 12 |
| 34 | 22 |
| 170 | 2 |

TABLE II

| Cell No. | Bond type | Temp. °F. | Current (amps/ft.²) | Membrane thickness (mils) | Test discontinued Time (hrs.) | Test discontinued Voltage[1] | Wet-proofed | No. of ply |
|---|---|---|---|---|---|---|---|---|
| 677 | Pt/TFE | 100 | Duty cycle | 6 | 936+ | | No | 2 |
| 678 | do | 100 | do | 6 | 792+ | | No | 2 |
| 679 | do | 100 | do | 6 | 504+ | | No | 2 |
| 680 | do | 100 | do | 6 | 756+ | | No | 2 |
| 681 | do | 100 | do | 6 | 744+ | | No | 2 |
| 682 | do | 100 | do | 6 | 744+ | | No | 2 |
| 683 | do | 100 | do | 6 | 645+ | | No | 2 |
| 684 | do | 100 | do | 6 | 273+ | | No | 2 |
| 205 | Unitary | 100 | do | 6 | 384+ | | No | 1 |
| 206 | do | 100 | do | 6 | 430+ | | No | 1 |
| 207 | do | 100 | do | 6 | 460+ | | No | 1 |
| 208 | do | 100 | do | 6 | 72+ | | No | 1 |
| 209 | do | 100 | do | 6 | 400+ | | No | 1 |
| 226 | do | 100 | do | 6 | 369+ | | No | 1 |
| 231 | do | 100 | do | 6 | 403+ | | No | 1 |
| 542 | Pt/TFE | 120 | 40 | 10 | 3692+ | | Yes | 2 |
| 547 | Ti-screen | 120 | 40 | 10 | 2677+ | | Yes | 2 |
| 548 | Tetra-etch | 120 | 40 | 10 | 2366+ | | Yes | 2 |
| 551 | Vibration | 120 | 40 | 10 | 1800+ | | No | 2 |
| 816 | Unitary | 100 | 40 | 10 | 1225+ | | Yes | 1 |
| 746 | Pt/TFE | 100 | Duty cycle | 6 | 2880 | | Yes | 2 |
| 747 | do | 100 | do | 6 | 2880 | | Yes | 2 |
| 749 | do | 100 | do | 6 | 2880 | | Yes | 2 |
| 750 | do | 100 | do | 6 | 2880 | | Yes | 2 |
| 751 | do | 100 | do | 6 | 2880 | | Yes | 2 |
| 752 | do | 100 | do | 6 | 1080 | | Yes | 2 |
| 753 | do | 100 | do | 6 | 1080 | | Yes | 2 |
| 754 | do | 100 | do | 6 | 1080 | | Yes | 2 |
| 755 | do | 100 | do | 6 | 1344 | | Yes | 2 |
| 756 | do | 100 | do | 6 | 2880 | | Yes | 2 |
| 617D | Unitary | 100 | 40 | 6 | 938+ | | No | 1 |
| 618D | do | 100 | 40 | 6 | 867+ | | No | 1 |
| 688 | Pt/TFE | 100 | Duty cycle | 6 | 4352 | 0.54 | Yes | 2 |
| 689 | do | 100 | do | 6 | 4281 | 0.46 | Yrs | 2 |
| 691 | do | 100 | do | 6 | 4035 | 0.26 | Yes | 2 |
| 738 | Unitary | 100 | do | 10 | 2925 | 0.17 | Yes | 1 |
| 739 | do | 100 | do | 10 | 2925 | 0.18 | Yes | 1 |
| 742 | do | 100 | do | 10 | 2925 | 0.31 | Yes | 1 |
| 743 | do | 100 | do | 10 | 2925 | 0.14 | Yes | 1 |
| 745 | do | 100 | do | 10 | 2925 | 0.12 | Yes | 1 |
| 768 | do | 100 | do | 10 | 2597 | 0.24 | Yes | 1 |
| 779 | do | 100 | do | 10 | 2481 | 0.20 | Yes | 1 |
| 780 | do | 100 | do | 10 | 2481 | 0.24 | Yes | 1 |
| 781 | do | 100 | do | 10 | 2481 | 0.19 | Yes | 1 |
| 782 | do | 100 | do | 10 | 2481 | 0.35 | Yes | 1 |

[1] Voltage measured in volts at 170 amps/ft.².
NOTE: += Time at which cell failed to deliver required current.

The results of the fuel cell tests are summarized in Table III by averaging the results of duplicate tests. As between membranes of comparable thickness operated at like temperatures without wet-proofing and operated on the duty cycle of Table I, the laminar type membrane was shown superior. As between membranes operated at constant load with wet-proofing and of comparable thickness, laminary membranes were shown superior to unitary membranes, even when handicapped by a 10° F. elevated temperature. As between membranes operated on the duty cycle and including wet-proofing, the laminar membranes were shown superior even when operated more than 1000 hours longer and further handicapped by being formed of a lesser membrane thickness. No inferences could be drawn between fuel cells operated at constant load and those operated on cyclic loads nor could inferences be drawn between fuel cells having wet-proofed electrodes and those not having wet-proofed electrodes.

TABLE III

| No. of ply | Bond type | Temp. °F. | Current (amps/ft.²) | Membrane thickness (mils) | Test discontinued Time (hrs.) | Test discontinued Voltage[1] | Wetproofed |
|---|---|---|---|---|---|---|---|
| 2 | Pt/TFE | 100 | Duty cycle | 6 | 674+ | | No. |
| 1 | Unitary | 100 | do | 6 | 359+ | | No. |
| 2 | Pt/TFE | 120 | 40 | 10 | 3692+ | | Yes. |
| 2 | Tri-screen | 120 | 40 | 10 | 2677+ | | Yes. |
| 2 | Tetra-etch | 120 | 40 | 10 | 2366+ | | Yes. |
| 2 | Vibration | 120 | 40 | 10 | 1800+ | | No. |
| 1 | Unitary | 100 | 40 | 10 | 1225+ | | Yes. |
| 2 | Pt/TFE | 100 | Duty cycle | 6 | 2186 | | Yes. |
| 1 | Unitary | 100 | 40 | 6 | 902+ | | No. |
| 2 | Pt/TFE | 100 | Duty cycle | 6 | 4222 | 0.42 | Yes. |
| 1 | Unitary | 100 | do | 10 | 2714 | 0.21 | Yes. |

[1] Voltage measured in volts at 170 amps/ft.².
NOTE: += Time at which cell failed.

What we claim as new and desire to secure by Letters Patent of the United States is:

1. A fuel cell comprising, an ion-exchange-membrane formed of bonded laminae, each of said laminae being characterized by the fact that the mobile ions therein are of the same type, said membrane including an electrolytically conductive interface between adjacent laminae, said physical bonding means being a corrosion resistant metal screen, electrodes mounted adjacent first and second faces of said membrane, and means for separately supplying fuel and oxidant to said first and second faces, respectively.

2. A fuel cell comprising,
ion exchange means including bonded anisotropic laminae, each of said laminae being characterized by the fact that the mobile ions therein are of the same type, and exhibiting a lower net anisotropism than said laminae,
said ion exchange means additionally including first and second faces,
electrodes adjacent said first and second faces,
and means for separately supplying fuel and oxidant to said first and second faces respectively.

3. A fuel cell comprising,
a laminar cation exchange membrane having first and second faces and comprised of first and second bonded cation exchange laminae, said laminae being positioned with an electrolytically conductive interface therebetween and a titanium-palladium alloy screen lying at the interface, first and second electrodes mounted adjacent said first and second faces, respectively, and, means for permitting a fuel and an oxidant to contact said first and second electrodes, respectively.

References Cited

UNITED STATES PATENTS

| | | | |
|---|---|---|---|
| 2,593,540 | 4/1952 | Cornwell et al. | |
| 3,009,578 | 11/1961 | Foote et al. | 204—296 |
| 3,134,697 | 5/1964 | Niedrach | 136—86 |
| 3,276,991 | 10/1966 | Hani et al. | |
| 3,310,481 | 3/1967 | Mock et al. | |
| 2,851,510 | 9/1958 | Pauli | 136—153 X |
| 2,829,095 | 4/1958 | Kenichi Oda et al. | 204—301 X |
| 3,198,666 | 8/1965 | Gruneberg et al. | 136—86 |
| 3,340,177 | 9/1967 | Rogers et al. | |
| 3,403,054 | 8/1968 | Puffer et al. | 136—86 |

FOREIGN PATENTS 93,638  6/1962  Denmark.

OTHER REFERENCES

Wilson, J. R.: Demineralization by Electrodialysis, 1960, Butterworths Scientific Pub., London (p. 141 relied on).

WINSTON A. DOUGLAS, Primary Examiner

M. J. ANDREWS, Assistant Examiner